May 14, 1968
T. W. BAILEY
3,383,193
GLASS-MOLDING APPARATUS
Filed Oct. 26, 1964
2 Sheets-Sheet 1
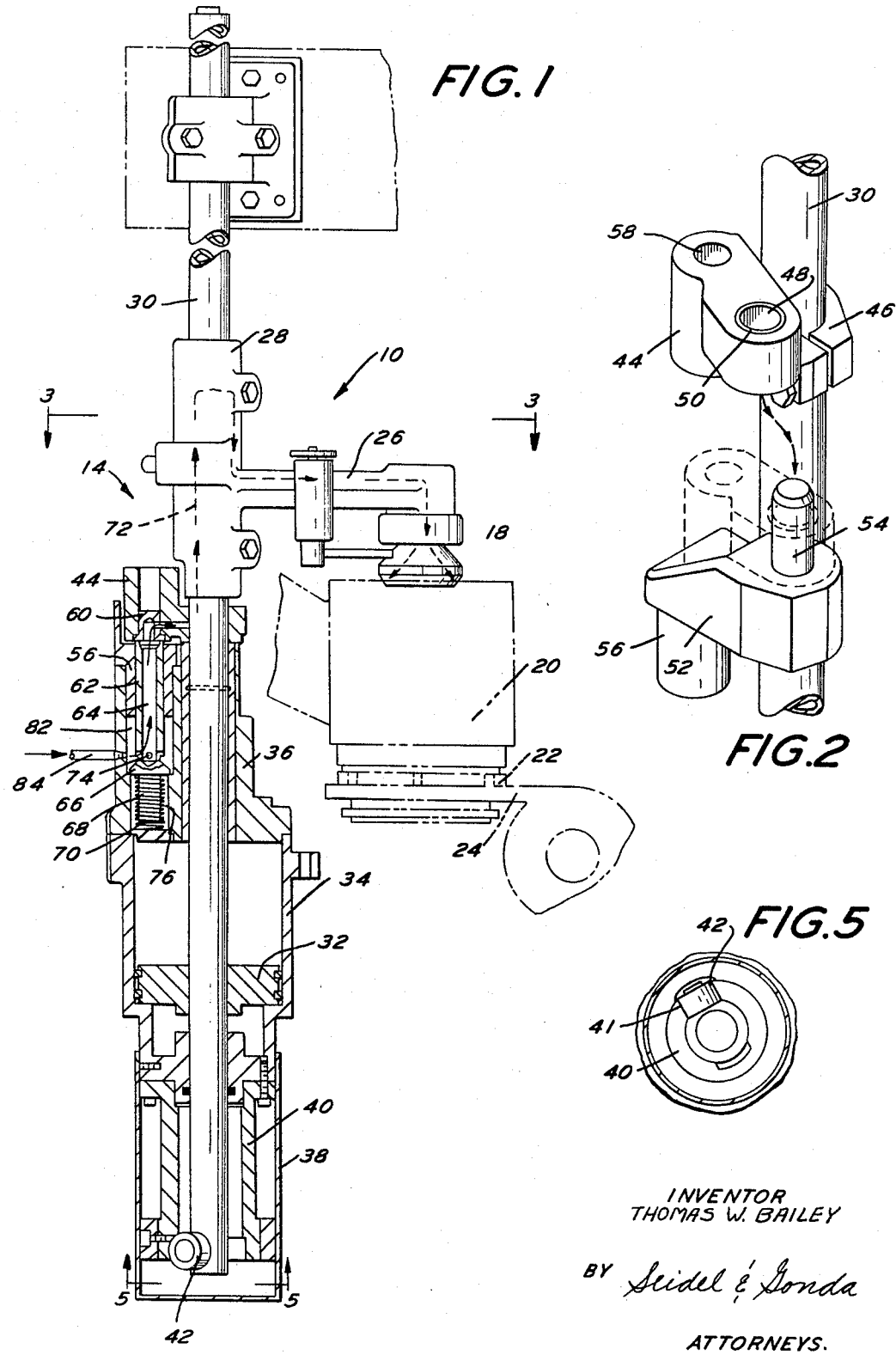
INVENTOR
THOMAS W. BAILEY
BY Seidel & Gonda
ATTORNEYS.

May 14, 1968 T. W. BAILEY 3,383,193
GLASS-MOLDING APPARATUS
Filed Oct. 26, 1964 2 Sheets-Sheet 2

INVENTOR
THOMAS W. BAILEY

BY Seidel & Gonda

ATTORNEYS.

United States Patent Office 3,383,193
Patented May 14, 1968

3,383,193
GLASS-MOLDING APPARATUS
Thomas W. Bailey, Santa Ana, Calif., assignor to Maul Brothers, Inc., Millville, N.J., a corporation of New Jersey
Filed Oct. 26, 1964, Ser. No. 406,317
2 Claims. (Cl. 65—234)

ABSTRACT OF THE DISCLOSURE

Apparatus for molding glass into hollow shaped articles. A baffle is guided into operative position at one end of a molding cavity by the intercooperation of a cam and cam follower mechanism and a telescoping pin and bore arrangement. The pin and bore absorb vibrations and prolong the life of the apparatus.

---

This invention relates to an apparatus for molding molten glass into hollow shaped articles.

Hollow glass articles are usually formed by first press molding a gob of molten glass into a parison or blank of molten glass. The formed blank or parison is then inverted and transferred to a blow mold wherein it is subjected to a blowing process forming the hollow glass article in its final shape.

The parison is usually formed in a blank mold positioned between a neck mold and a baffle. A gob of glass is dropped through one end of a molding cavity in the blank mold. The baffle is then seated on the blank mold to close the end of the molding cavity. A vertically reciprocable plunger is brought up through the neck mold into the molding cavity in the blank mold for pressing the gob of glass into a parison against the walls of the molding cavity. The bottom of the molded parison is caught and retained in the neck mold.

After the plunger is withdrawn and the pressing operation completed, the baffle is elevated and removed from the blank mold. The blank mold is then elevated. The parison remaining in the neck mold is then transferred to a blow mold wherein the blowing operation referred to above takes place.

One method which is used for transferring the parison to the blow mold is to oscillate the neck mold and retained parison, thereby inverting the parison and positioning it in the blow mold. The neck mold is split so that by pivoting the split halves relative to each other the parison may be dropped into the blow mold. When this operation takes place, the baffle and the blank mold must not only be elevated, but must be pivoted out of the path of oscillation of the neck mold.

Accordingly, it is an object of this invention to provide an improved glass molding apparatus.

A further object of this invention is to provide a glass molding apparatus having a novel baffle assembly.

A still further object of this invention is to provide a glass molding apparatus having a baffle assembly which is adapted to be positively guided and aligned with a molding cavity in a blank mold during the parison forming operation in the cycle of the apparatus.

Yet another object of this invention is to provide glass molding apparatus wherein shocks and static vibrations are absorbed and minimized as the baffle assembly is moved towards and away from the blank mold before and after a parison is formed in the blank mold.

Other objects will appear from the disclosure which follows hereinafter.

For the purpose of illustrating the invention, there is shown in the drawings a form which is presently preferred; it being understood, however, that this invention is not limited to the precise arrangements and instrumentalities shown.

FIGURE 1 is a fragmentary side view in elevation, partly in section, of the baffle assembly of the glass molding apparatus constructed in accordance with the principles of the present invention.

FIGURE 2 is a fragmentary perspective view of a baffle guide and dog assembly for aligning the baffle of the glass molding apparatus with a mold cavity and for dampening shocks and absorbing vibrations in the baffle assembly during movement of the baffle towards and away from a parison mold.

FIGURE 5 is a cross-sectional view taken substantially along the plane indicated by line 5—5 of FIGURE 1.

Figure 3:
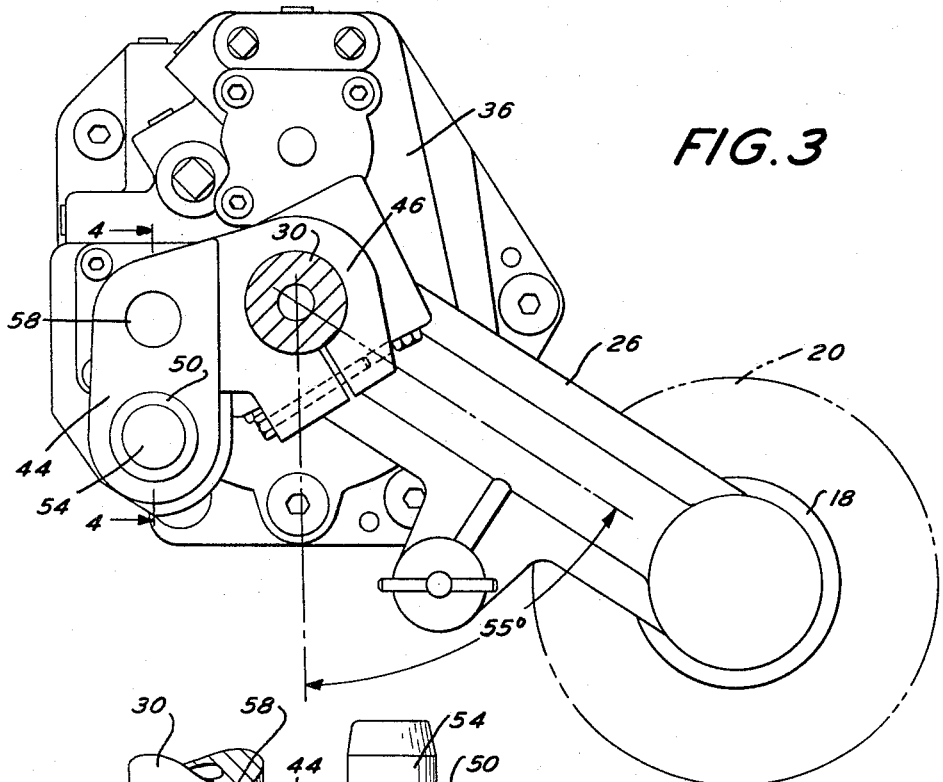
FIGURE 3 is a cross-sectional view taken substantially along the plane indicated by the line 3—3 of FIGURE 1.

The molding apparatus of the present invention is generally designated by the numeral 10. The apparatus 10 includes a frame supporting a baffle mechanism generally designated by the numeral 14.

The baffle mechanism 14 includes a baffle 18, which is adapted to be seated in line with a molding cavity in a blank mold. The blank mold is supported by means of a mold holder arm 20 and in turn is seated upon a neck mold 22.

As is well-known in the art, a parison or hollow glass blank is pressed within the blank mold. The formed parison is adapted to be transferred from the parison forming station to a blowing station. At the blowing station, the formed parison is positioned within a blow mold and the parison is blown into its final shape. The bottom of the molded parison is adapted to be caught and retained in a neck mold as shown at 22.

After the plunger is withdrawn and the pressing operation is completed, the baffle 18 is elevated and removed from the blank mold. The mold holder arm 20 and blank mold are then elevated. The parison remaining in the neck mold 22 is transferred to a blow mold by means of a neck mold transfer arm 24 wherein the blowing operation described above takes place.

The transfer arm 24 inverts the neck mold and oscillates it through an arc of approximately 180°. In order to insure that the components of the glass molding apparatus do not interfere with each other during their normal operation, the mold holder 20 and baffle 18 are raised and oscillated out of the path of oscillation of the neck mold transfer arm 24. After the formed parison has been released at the blowing station, the components of the glass molding apparatus shown in FIGURE 1 are recycled. The baffle 18 must be seated in line with the molding cavity within the blank mold held within the mold holder arm 20 after a gob or fresh charge of molten glass is deposited within the mold.

The baffle 18 is connected by means of a baffle arm 26 and sleeve 28 to a piston rod 30. The piston rod 30 is coupled to a piston 32 reciprocable and rotatable within a baffle cylinder 34. The baffle cylinder 34 is adapted to be connected to the frame of the apparatus.

Figure 6:
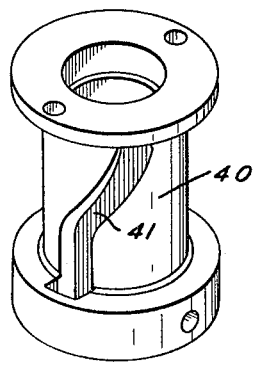
FIGURE 6 is a perspective view of a cam element used in the baffle assembly shown in FIGURE 1.

A baffle cylinder head 36 closes one end of the baffle cylinder 34. Connected to the other end of the baffle cylinder 34 is a cam housing 38. Rigidly disposed within the cam housing 38 is a cam 40. The piston rod 30 extends through the piston 32 and baffle cylinder 34 into the cam housing 38. The end of the piston rod 30 within the cam housing 38 has a cam follower 42. The cam follower 42 is in contact with the sides of a cam slot 41 formed along the interior of the hollow cam 40. As seen in FIGURE 6 the cam slot 41 has an initial portion which is vertical and a second portion which is a wound helix. Hence, as the piston rod moves upwardly by means of a fluid being introduced beneath the piston 32, it will initially move linearly for a predetermined linear distance and for the remaining portion of its stroke will not only move in a linear vertical direction, but will also rotate. Since the baffle 18 is coupled to the piston rod 30, the movement of the piston rod will be transmitted to the baffle. The baffle 18 will first move linearly away from the mold holder arm 20 for a predetermined distance, and will then oscillate as it moves linearly at the end of its stroke. As shown in FIGURE 3, the baffle 18 is oscillated through an arcuate path of approximately 55°.

Secured to the top of the cylinder head 36 to one side of the piston rod 30 is a baffle guide element 52. The baffle guide element is stationary. An upright guide pin 54 projects upwardly from the baffle guide element 52. The upright guide pin 54 has its axis substantially parallel to the longitudinal axis of the piston rod 30.

Secured to the piston rod 30 intermediate the sleeve 28 and the baffle cylinder head 36 is a baffle dog 44. A clamp 46 integral with the dog 44 clamps the dog 44 to the piston rod 30 so that the movement of the piston rod 30 is transmitted to the dog 44. The dog includes a bore 48 therethrough. A bushing 50 is positioned within the bore 48 for substantially its entire length.

As shown in FIGURE 2, the bore 48 in the baffle dog element 44 follows the path of the arrows during movement of the piston rod 30 to position the baffle 18 in seated engagement with the molding cavity in the blank mold held by the mold holder arm 20. As the piston rod rotates, the bore 48 comes in line with the upright pin 54 projecting from the guide element 52. Continued downward movement of the piston rod 30 during the linear portion of its stroke causes the bore 48 to telescope over the upright pin 54. This insures proper alignment of the baffle 18 with the molding cavity in the blank mold. The location of the piston rod 30 as well as the baffle 18 is fixed due to the telescoping engagement of the bore 48 and the pin 54.

The telescoping engagement of the bore 48 and pin 54 not only insures alignment of the baffle 18 with the molding cavity in the blank mold but dampens shocks and absorbs static vibrations induced in the piston rod 30 created by the cam shifting the piston rod from its rotation and linear movement to its strictly linear movement. Further wear on the cam and cam follower are substantially reduced since vibrations are dampened and "chatter" between the cam and cam follower are substantially eliminated.

The baffle element 52 includes a stem 56 which fits within the baffle cylinder head 36. The baffle guide element 52 is then securely locked in position by means of hexhead cap screws shown in FIGURE 3.

While baffle guide element 52 and the baffle dog 44 permit alignment of the baffle with the molding cavity in the blank mold and absorb and dampen vibrations in the piston rod 30, as described above, they also permit the introduction of settling air from the baffle 18 into the molding cavity of the blank mold and the neck mold. Generally, the molten glass charges fed into the blank mold are smaller than the capacity of the blank mold. Settle blowing pressure is supplied through the baffle 18 into the upper end of the molding cavity in the blank mold and from there into the neck mold 22. The settle blowing pressure expands the molten charges into conformity with the internal molding cavities of the blank mold and neck mold and against the baffle prior to the pressing of the charges by a plunger brought up through the neck mold and blank mold.

Figure 4:
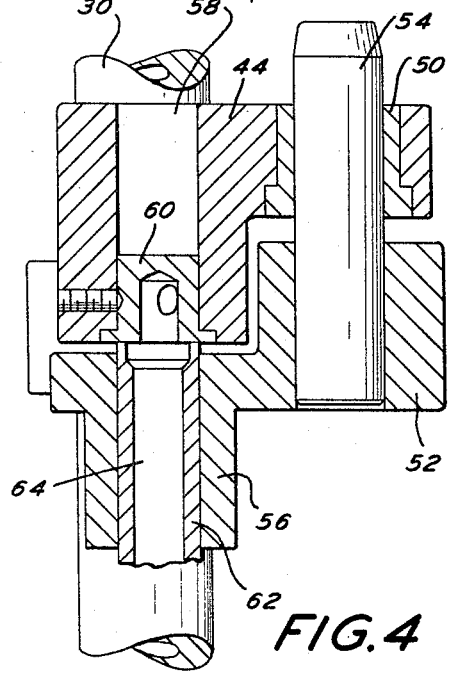
FIGURE 4 is a cross-sectional view taken substantially along the plane indicated by the line 4—4 of FIGURE 3.

As shown in FIGURES 1 and 4, the baffle dog 44 is provided with a second bore 58 therethrough. A hollow bushing 60 is clamped in the bore 58 adjacent the end thereof which overlies the guide element 52.

The stem 56 of the guide element 52 is also hollow and receives a tubular valve element 62. The valve element 62 has a bore 64 adapted to communicate at one end through inlet bores 74 with a chamber 82 within baffle cylinder head 36. Air is adapted to enter chamber 82 through nozzle 84. Intermediate its ends, the valve element is enlarged to form a valve stop 66. Projecting downwardly from the valve stop 66 is a projection or stem 68 residing in a hollow cavity 76 within the baffle cylinder head 36. A spring 70 is wound around the stem 68 and normally urges the valve stop 66 upwardly into engagement with the stem 56 of the baffle guide element 52.

When the baffle 18 and baffle dog 44 have been moved away from the blank mold, the spring 70 urges valve stop 66 upwardly and causes the valve element 62 to move upwardly to position the inlet bores 74 completely within and enclosed by the stem 56.

When the baffle 18 is moved downwardly to assume the position shown in FIGURE 1 in communication with the molding cavity of the blank mold, the bushing 60 contacts the upper end of the valve element 62 and pushes it downwardly against the bias of the spring 70. Settle air is then caused to flow from nozzle 84 into the chamber 82 and through the path indicated by the arrows 72. That is, air enters within the cavity 82 in the cylinder head 36, flows through the bores 74 into the bore 64 of the valve 62, through the baffle dog 44, through the hollow interior of piston rod 30, through hollow baffle arm 26, into the baffle 18 and from there into the molding cavity in the blank mold. When the baffle 18 and baffle dog 44 are moved upwardly, the spring 70 returns the valve 62 to its closed position.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for forming hollow glass articles from supplied charges of molten glass into a mold having a molding cavity adapted to receive charges of molten glass, said apparatus comprising a baffle arm adapted to be connected to a baffle, said arm adapted to be moved into a position wherein the baffle will be seated on a mold to close the molding cavity therein, mechanical means coupled to said arm for effecting reciprocating and oscillation of said arm towards and away from the mold, said mechanical means including a stationary cylinder, a reciprocably movable piston within said cylinder, a piston rod coupled to said piston and arm, cam means mechanically cooperating with said piston rod for causing said arm to rotate through a predetermined arc during a predetermined portion of its travel, aligning means for aligning said arm and the mold cavity during vertical movement of said arm towards the mold, wherein rotation takes place only until said arm is a predetermined linear distance from the mold, said aligning means being operative to align the arm and thereby align the baffle with the mold during vertical travel of said arm and said piston rod through said predetermined linear distance said aligning means including two elements cooperating together, said elements being out of contact during rotation of said arm, said elements cooperating during movement of said arm through said predetermined linear distance, one of said elements having a pin projecting therefrom, said pin having an axis substantially parallel to said piston rod, the other of said elements being a dog element having a bore means for telescoping engagement with said pin during vertical movement of said arm toward said mold and said aligning means absorbing vibrations as said arm is moved through said predetermined linear disance.

2. Apparatus for forming hollow glass articles from supplied charges of molten glass in a mold, said apparatus comprising a baffle assembly, said baffle assembly including a baffle arm adapted to be moved towards and away from the mold to an operative position to an inoperative position respectively, mechanical means coupled to said baffle arm for effecting reciprocation and oscillation of said baffle arm towards and away from the mold, said mechanical means including a stationary cylinder, a reciprocably movable piston within said cylinder, a piston rod coupled to said piston and baffle arm, cam means mechanically cooperating with follower means on said piston rod for causing said baffle arm to rotate through a predetermined arc during a fixed portion of its linear travel, a fixed support, said fixed support including means aligning said baffle arm and mold cavity during movement of said baffle arm toward said mold for absorbing vibrations transmitted to said piston rod, said aligning means including a fixed guide element mounted on said fixed support, a pin projecting from said fixed support, said pin having an axis substantially parallel to said piston rod, a dog element mounted on said piston rod above said guide element, said dog element including bore means for telescoping engagement with said upright pin during movement of said baffle arm towards said mold, said pin being out of engagement with said dog element during oscillation of said dog element, said dog element supported for reciprocation and oscillation with said baffle arm, valve means supported by said fixed support for admitting settling air to the baffle arm and a baffle adapted to be carried thereby, and means carried by said dog element for actuating said valve means when said baffle arm is in operative position.

References Cited

UNITED STATES PATENTS

| | | | |
|---|---|---|---|
| 1,976,239 | 10/1934 | Lorenz et al. | 65—232 |
| 2,081,858 | 5/1937 | Howard | 65—234 |
| 2,385,302 | 9/1945 | Schellhaus | 65—323 |

DONALL H. SYLVESTER, *Primary Examiner.*

F. W. MIGA, *Examiner.*